United States Patent [19]

Imoto

[11] Patent Number: 5,237,431
[45] Date of Patent: Aug. 17, 1993

[54] IMAGE READING APPARATUS FOR PRODUCING HIGH QUALITY IMAGES BASED ON TONE CORRECTION

[75] Inventor: Yoshiya Imoto, Kanagawa, Japan

[73] Assignee: Fuji Xerox Co., Ltd., Tokyo, Japan

[21] Appl. No.: 717,044

[22] Filed: Jun. 18, 1991

[30] Foreign Application Priority Data

Jun. 19, 1990 [JP] Japan ................................ 2-160352

[51] Int. Cl.⁵ .......................... H04N 1/40; H04N 1/46
[52] U.S. Cl. .................................. 358/445; 358/462; 358/467; 358/448; 358/443; 358/500
[58] Field of Search ................ 358/429, 431, 443, 444, 358/445, 447, 448, 452, 453, 455, 456, 457, 458, 460, 461, 462, 464, 465, 466, 467, 471, 474, 75, 80; 382/50, 51, 54

[56] References Cited

U.S. PATENT DOCUMENTS 4,553,160  11/1985  Yamamoto et al. .................. 358/75
5,132,786  7/1992  Ishiwata ............................. 358/75

FOREIGN PATENT DOCUMENTS 61-100026  5/1986  Japan.

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

An image reading apparatus including an A/D converter for converting an analog detection signal read by an image reading sensor to a digital signal, a logarithmic converter, in which density levels to be converted are divided into a plurality of regions, for converting an output of the A/D converter to a logarithmic value, a decoder for judging a density region of the logarithmic converter based on the output of the A/D converter, and a bit shifter for converting an output of the logarithmic converter to a density signal in accordance with a judgment made by the decoder. The image reading apparatus as constructed above can maintain the tone level of an 8-bit signal, thereby producing high-quality images. Further, 10-bit signals can be subjected to shading correction while using an inexpensive 8-bit memory.

9 Claims, 10 Drawing Sheets

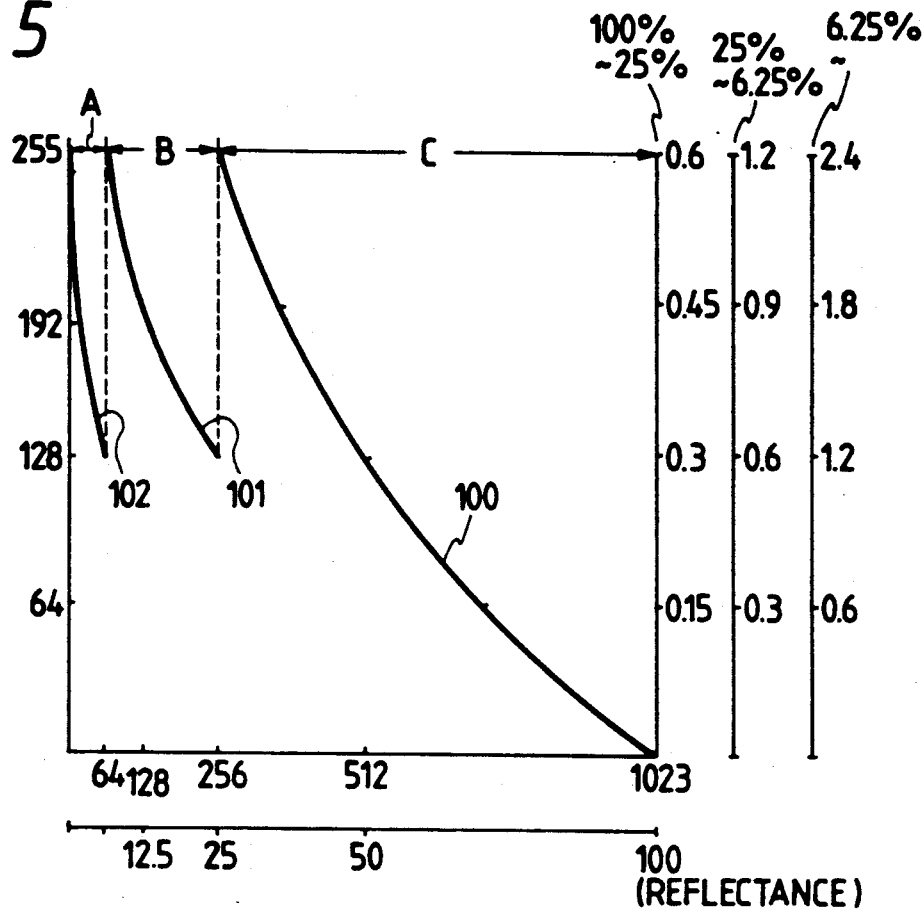

FIG. 6(b)

| REFLEC-TANCE | INPUT DATA TO LOG LUT<br>$D_9$ $D_8$ $D_7$ $D_6$ $D_5$ ------ $D_0$ | OUTPUT DATA OF BIT SHIFTER<br>$D_9$ $D_8$ $D_7$ $D_6$ ------ $D_1$ $D_0$ | DENSITY VALUE |
|---|---|---|---|
| 100% | 1 1 1 1 1 ---- 1 | (0) (0) 0 0 0 ---- 0 0 | 0.00 |
| 50.05%<br>49.95% | 1 1 1 0 1 ---- 0<br>1 0 1 1 1 ---- 1 | (0) (0) 0 0 1 ---- 1 1   (LOG LUT)<br>(0) (0) 0 1 1 ---- 1 0   OUTPUT |
| 25.02%<br>24.93% | 0 1 0 0 1 ---- 0<br>0 0 1 1 1 ---- 1 | (0) (0) 1 1 1 ---- 1 0<br>(0) 0 1 1 0 ---- (0) (0)   ←BIT-SHIFTING | 0.602 |
| 12.51%<br>12.41% | 0 0 0 0 1 ---- 0<br>0 0 0 1 1 ---- 1 | (0) 1 1 1 0 ---- (0) 0<br>1 0 0 1 0 ---- (0) (0) | 0.903 |
| 6.26%<br>6.16% | 0 0 0 0 0 ---- 0<br>0 0 0 0 1 ---- 1 | (0) 1 1 1 1 ---- (0) (0)<br>1 0 0 1 1 ---- (0) (0)   ←BIT-SHIFTING | 1.204 |
| 0.4% | 0 ---- 0 1 1 | 1 1 1 1 1 ---- (0) (0) | 2.408 |

"(0)" MEANS A BIT WHICH IS ABSENT IN LOG LUT AND TO WHICH "0" IS WRITTEN BY BIT SHIFTER

| INPUT DATA TO LOG LUT | | | | OUTPUT DATA OF BIT SHIFTER | | | |
|---|---|---|---|---|---|---|---|
| $D_9$ | $D_8$ | $D_7$ | $D_6$ | $D_9$ | $D_8$ | $D_0$ | SHIFTING AMOUNT |
| 1 | 1 | X | X | 0 | 0 | - | 0 |
| 1 | 0 | X | X | 0 | 0 | - | 0 |
| 0 | 1 | X | X | 0 | 0 | - | 0 |
| 0 | 0 | 1 | X | 0 | 1 | - | 0 |
| 0 | 0 | 0 | 1 | 0 | 1 | - | 0 |
| 0 | 0 | 0 | 0 | 1 | - | 0 | 1 |

FIG. 8(b)

| REFLEC-TANCE | INPUT DATA TO LOG LUT<br>D9 D8 D7 D6 D5 ---- D0 | OUTPUT DATA OF BIT SHIFTER<br>D9 D8 D7 D6 ---- D1 D0 | DENSITY VALUE |
|---|---|---|---|
| 100% | 1 1 1 1 1 ---- 1 | (0) (0) 0 0 0 ---- 0 0 | 0.00 |
| 50.05%<br>49.95% | 1 0 1 1 0 ---- 0<br>0 1 1 1 1 ---- 1 | (0) (0) 0 0 0 ---- 1 1<br>(0) (0) 0 1 0 ---- 0 0 <br>(LOG LUT)<br>OUTPUT | 0.301 |
| 25.02%<br>24.93% | 0 1 0 0 0 ---- 0<br>0 0 1 1 1 ---- 1 | (0) (0) 0 1 1 ---- 1 0<br>(0) (0) 1 0 0 ---- 0 0 | 0.602 |
| 12.51%<br>12.41% | 0 0 1 0 0 ---- 0<br>0 0 0 1 1 ---- 1 | (0) (0) 1 1 0 ---- 0 1<br>(0) (0) 1 1 1 ---- 0 0 | 0.903 |
| 6.26%<br>6.16% | 0 0 0 1 0 ---- 0<br>0 0 0 0 1 ---- 1 | (0) (1) 1 0 0 ---- 1 1<br>(0) (1) 1 0 1 ---- 0 (0) | 1.204 |
| 0.4% | 0 ---------- 0 1 | (1) 1 1 1 1 ---- 1 (0) | 2.408 |

"(1)" IS A BIT TO WHICH "1" IS WRITTEN BY BIT SHIFTER
"(0)" IS A BIT TO WHICH "0" IS WRITTEN BY BIT SHIFTER

IMAGE READING APPARATUS FOR PRODUCING HIGH QUALITY IMAGES BASED ON TONE CORRECTION

BACKGROUND OF THE INVENTION

The invention relates to an image reading apparatus capable of ensuring high tone quality.

There are many apparatuses of recent development, which photoelectrically read color documents, subject the read documents to various color image processing, and produce color image prints.

As shown in FIG. 10, such a color image reading apparatus produces color prints as follows. A color document is read by an image sensor 226 consisting of a multiplicity of photodiode arrays, the read data is converted to an 8-bit digital signal by an A/D converter 231, and the digital signal is subjected to dark correction by a dark correction unit 235 to eliminate sensitivity variations among respective pixels. The dark correction is such that a reference signal read in darkness is subtracted from the digital signal. The dark-corrected digital signal is converted to a density-correspondent digital signal while subjecting the signal corresponding to reflectance data to a logarithmic conversion process by a density converter 236. The density-converted digital signal is then subjected to shading correction by a shading correction unit 237, where a reference signal produced at the time of reading a white region is subtracted from the density-corrected digital signal. The shading-corrected signal is gray-balanced by an END conversion module 301, and the gray-balanced color signal is thereafter outputted to other conversion modules of an image processing system (IPS).

While a conventional A/D converter converts a detected signal into an 8-bit signal at an equal pitch, the density converter 236 converts 8-bit reflectance data to 8-bit density data to produce 256 tone levels based on a look-up table having such a logarithmic curve as shown in FIG. 11. As the signal is subjected to a curve changed conversion process or a bent conversion process by referring to the look-up table, a plurality of tone levels may, in some cases, be reduced into a single tone level in some low-density pixel regions whose conversion curve is dull, while a plurality of tone levels may be reproduced as desultory stepping levels in some high-density pixel regions whose conversion curve is sharp. As a result, even though detected as 8-bit data, such signal cannot produce 256 tone levels, impairing the reproduced tone quality. Once the reproduction of 256 tone data has been impaired at this stage, such impairment is imparted to subsequent image processing stages, eventually deteriorating the quality of produced images due to absence of 256-tone data. Thus, such shortcoming must in some way be prevented.

The invention has been made in view of the above circumstances.

SUMMARY OF THE INVENTION

Accordingly, an object of the invention is to provide an image reading apparatus capable of producing high-quality images with their tone levels faithfully reproduced.

Another object of the invention is to provide an inexpensive image reading apparatus capable of performing density conversion and shading correction without impairing the tone quality of produced images.

To achieve the above objects, an image reading apparatus according to the present invention comprises A/D conversion means for converting an analog detection signal read by an image reading sensor to a digital signal consisting of n +$\Delta$n bits, wherein n and $\Delta$n are positive integers excluding "0", logarithmic conversion means, in which density levels to be converted are divided into a plurality of regions, for converting an output of the A/D conversion means to a logarithmic value consisting of n bits, the plurality of regions having different converting characteristics respectively, judgement means for judging a density region of the logarithmic conversion means based on the output of the A/D conversion means, and bit conversion means for converting an output of the logarithmic conversion means to a density signal consisting of n+$\Delta$n bits in accordance with a judgment made by the judgment means.

BRIEF DESCRIPTION OF THE DRAWINGS

FIG. 5 is a diagram showing an example of a logarithmic conversion characteristic;

FIGS. 6 (a) and 6 (b) are diagrams for explaining bit shifting;

FIGS. 8 (a) and 8 (b) are diagrams for explaining bit shifting;

DETAILED DESCRIPTION OF THE PREFERRED EMBODIMENTS

While the invention may be applicable to various recording apparatuses such as printers, copying machines, or facsimile machines, the following description takes as an example its application to a copying machine.

Figure 2:
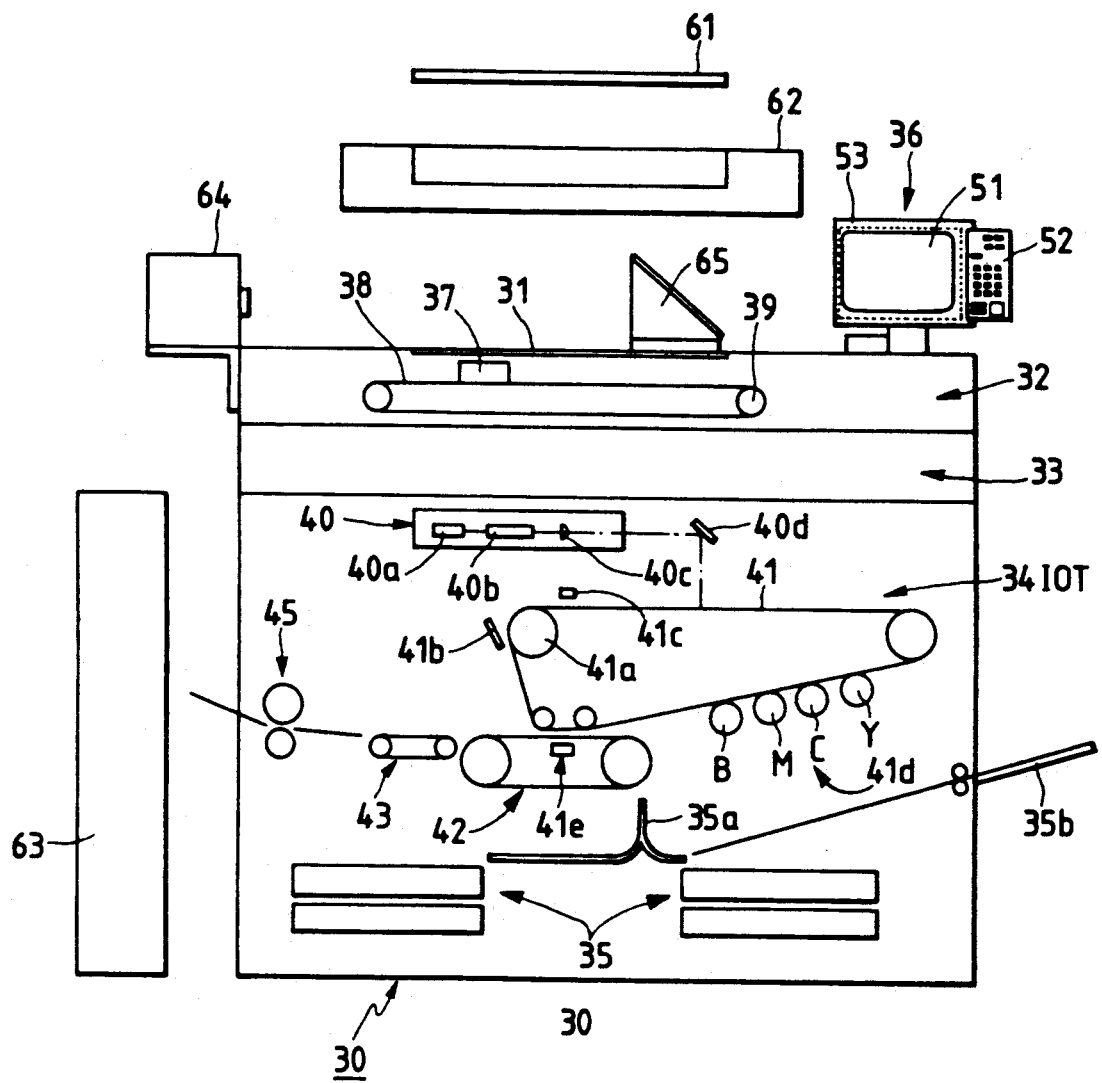
FIG. 2 is a schematic diagram showing the configuration of a copying machine to which the invention is applied.

FIG. 2 is a diagram showing an exemplary general configuration of a color copying machine to which the invention is applied.

This color copying machine comprises a base machine 30 which is a main component. The base machine 30 includes: a platen glass 31 on which a document is placed; image input terminal (IIT) 32; electric system controller containing section 33; image output terminal (IOT) 34; recording sheet trays 35; and user interface (UI) 36. The base machine 30 also includes as options an edit pad 61, automatic document feeder (ADF) 62, sorter 63, and film projector (FP) 64.

Electric hardware is required to control the IIT, IOT, and UI. Such hardware consists of a plurality of boards, each corresponding to a processing unit such as IIT, IPS (image processing system which processes IIT output signals), UI, or FP. These boards are accommodated in the electric control system containing section 33 together with an SYS board which controls these processing units and an MCB board (machine control board) which controls the IOT, ADF, and the sorter.

The IIT 32 includes an imaging unit 37, wire 38 for driving the imaging unit 37, and drive pulley 39. The IIT 32 reads a color document by each primary color of light, which is B (blue), G (green), or R (red), using a CCD line sensor and color filters contained in the imaging unit 37 to convert the read data to digital image signals, and applies the digital image signals to the IPS.

The IPS then converts the B, G, R signals produced at the IIT 32 to the primary colors of toner, which are Y (yellow), C (cyan), M (magenta), and K (black). To improve their reproducibility in color, tone, fineness, and the like, the IPS further subjects the toner signals to various processes to produce toner signals in process color tone and converts the toner signals in process color tone to binary-coded on/off toner signals. The thus processed toner signals are then applied to the IOT 34.

The IOT 34, which includes a scanner 40 and photosensitive belt 41, converts an image signal from the IPS to an optical signal at its laser output section 40a and forms a latent electrostatic image corresponding to a document on the photosensitive belt 41 through a polygon mirror 40b, F/θ lens 40c, and reflecting mirror 40d. The photosensitive belt 41 is driven by a drive pulley 41a and has a cleaner 41b, charger 41c, developing units 41d for the toner colors of developing Y, M, C, and K, and transfer unit 41e around the belt 41. Confronting the toner unit 41e is transfer device 42, which bites in a recording sheet fed from a recording sheet tray 35 via recording sheet feed path 35a. To make a full four-color copy, the transfer device 42 is driven to make four rotations, so that an image is transferred onto the recording sheet in the order of Y, M, C, and K. The transferred recording sheet is fused at a fuser 45 after passing a vacuum feed unit 43 while sent from the transfer device 42 and then discharged. Further, recording sheets can be also supplied from an SSI (single sheet inserter) 35b to the recording sheet feed path 35a alternatively.

The UI 36, which serves to select a function desired by the user and instruct execution conditions for the selected function, has a color display 51 and a hard control panel 52 therebeside. Combining an infrared touchboard 53 with these components, direct instruction of functions can be made from soft buttons on its screen.

The options of the base machine 30 will be described next. The edit pad 61 serving as a coordinate input unit is placed on the platen glass 31 and enables various image editing operations to be performed with the help of an input pen or memory card. The existing ADF 62 and sorter 63 can also be mounted as options.

An additional feature of this embodiment is a mirror unit (MU) 65, which is placed on the platen glass 31. A film image is projected onto the MU 65 from the FP 64 and the projected image is read as an image signal by the imaging unit 37, so as to enable direct production of color copies from color films. The MU 65 can process such documents as negative films, positive films, or slides, and is equipped with an automatic focusing unit and a correcting filter automatic replacement unit.

Figure 3:
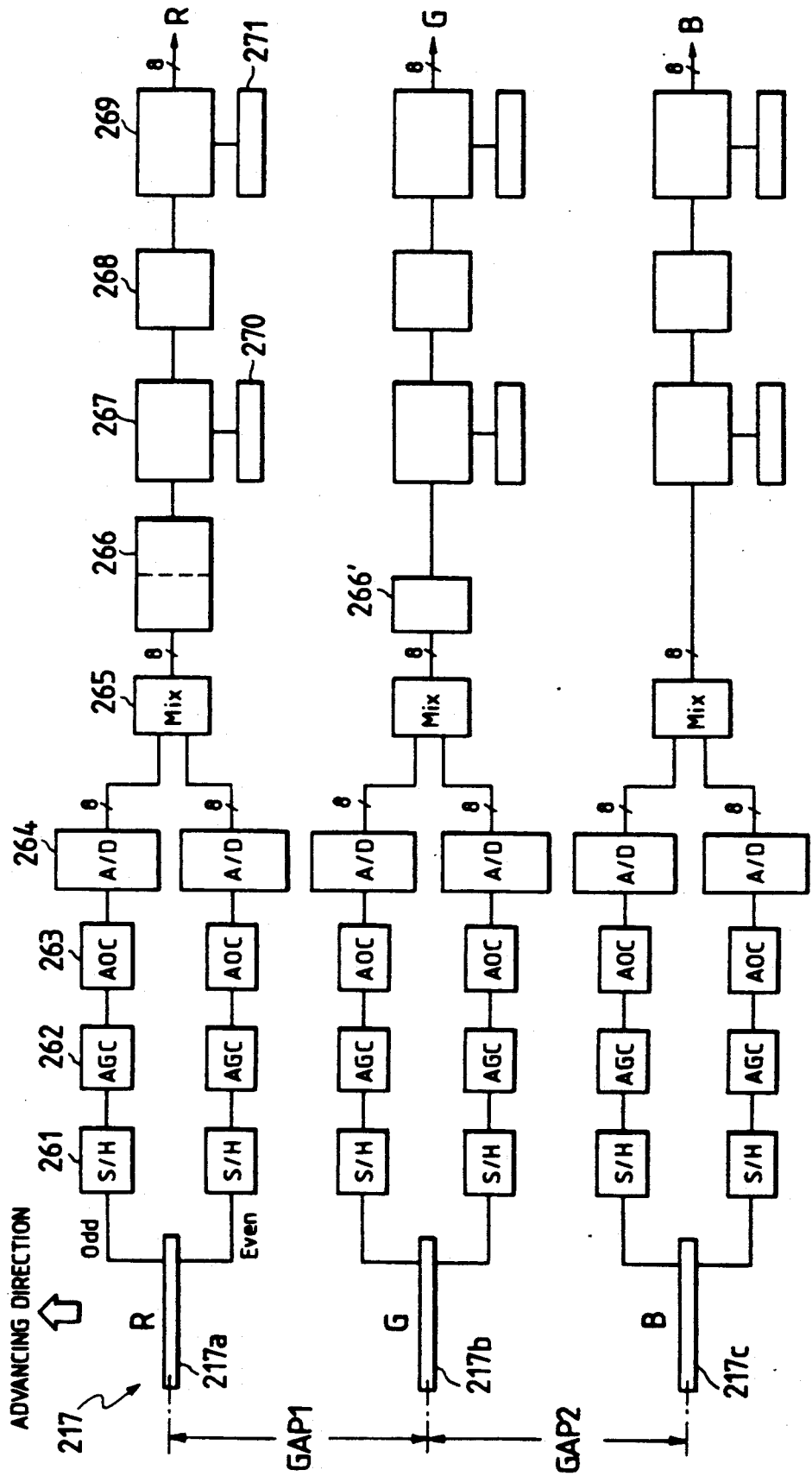
FIG. 3 is a diagram showing the configuration of a video signal processing circuit.

FIG. 3 is a diagram showing an exemplary image signal processing circuit using three line sensors (an optical system for reduction/enlargement).

In FIG. 3, a three-color line sequential sensor 217 includes: a sensor 217a for pixel rows with a color filter having a spectral response to R (red); a sensor 217b for pixel rows with a color filter having a spectral response to G (green); and a sensor 217c for pixel rows with a color filter having a spectral response to B (blue). This sensor 217 converts an image signal obtained by reflected light from a color document to R, G, and B color-separated image signals and outputs pixel data on an even-numbered pixel (Even) or an odd-numbered pixel (Odd) basis. The image signal processing circuit shown in FIG. 3 includes: a sample hold circuit 261; gain adjustment circuit AGC (automatic gain control) 262; offset adjustment circuit AOC (automatic offset control) 263; A/D conversion circuit 264; mixer 265; gap correction memories 266 and 266'; dark output correction circuit 267; logarithmic conversion table 268; and shading correction circuit 269. This image signal processing circuit sample-holds analog image signals from the three-color line sequential sensor 217, subjects the sample-held signals to gain control and offset control and converts them to digital signals. The thus obtained digital signals are subjected to gap correction, shading correction, and conversion from luminance signals to density signals.

The gap correction memories 266 and 266', serving to correct a gap between the two pixel rows, is formed of line memories of a FIFO (first-in first-out) structure. If the sampling density in the auxiliary scanning direction is to be changed in accordance with a reduction/enlargement rate, the amount of gap correction is adjusted commensurate with such a change. Each memory stores signals from a pixel row whose document scanning precedes that of the other pixel rows and outputs signals of the respective pixel rows in synchronism with one another.

The logarithmic conversion table 268 is a look-up table (LUT) formed of, e.g., a ROM for converting a reflection signal to a density signal. The R, G, B color-separated signals obtained from the reflected light from the document are converted to R, G, B density signals. The dark output correction circuit 267 and shading correction circuit 269 have SRAMs 270 and 271, respectively, and perform processes such as shading correction and image data input adjustment.

For dark output correction and shading correction, reference data are written in the SRAMs and their correction process is such that the reference data are subtracted from inputted image data to produce respective outputs. Such process allows correction of variations attributable to secular change in the light distribution characteristic of a light source or secular change in the light source itself; optical system-based variations attributable to, e.g., the contaminated reflecting mirror and lens; and variations in the sensitivity between respective pixels of three-color line sequential sensor 217. The dark output correction circuit 267 is connected prior to the conversion table 268 to correct signals with respect to the dark level (the output in darkness with a not shown fluorescent lamp turned off), while the shading correction circuit 269 is connected after the conversion table 268 to correct the dark-corrected signals with respect to an output produced by reading a white reference plate. For such processes, both dark output data and white reference plate reading data are written into the respective SRAMs 270 and 271 as reference data.

Figure 4:
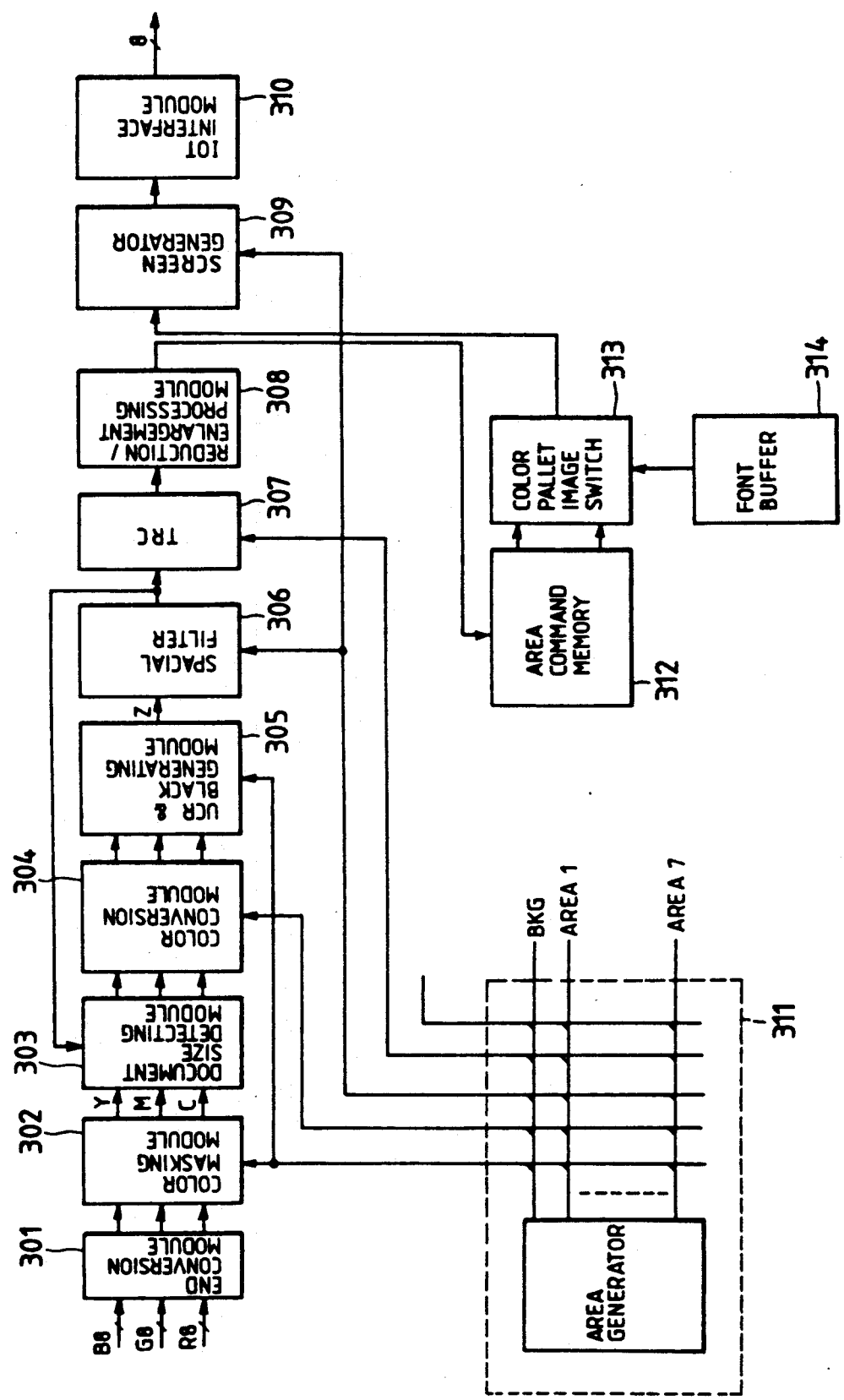
FIG. 4 is a schematic diagram showing the arrangement of modules in an image processing system.

FIG. 4 is a schematic diagram showing the arrangement of IPS modules.

As shown in FIG. 4, the IPS is made up of an END (equivalent neutral density) conversion module 301, color masking module 302, document size detecting module 303, color conversion module 304, UCR (under color removal)/black generating module 305, spacial filter 306, TRC (tone reproduction control) module 307, reduction/enlargement processing module 308, screen generator 309, IOT interface module 310, area image control module 311 including an area generator and a switch matrix, and an edit control module including an area command memory 312, color palette video switch 313, and font buffer 314.

In the IPS, the 8-bit data (256 gray levels) on each of the separated color signals B, G and R is applied to the END conversion module 301 to be gray-balanced. The color masking module 302 converts the gray-balanced data into the toner signals of Y, M and C. A process color toner signal is selected, and is digitized. The digitized signals are transferred, as the on/off data of the process color toner signals, from the IOT interface module 310 to the IOT.

Figure 1:
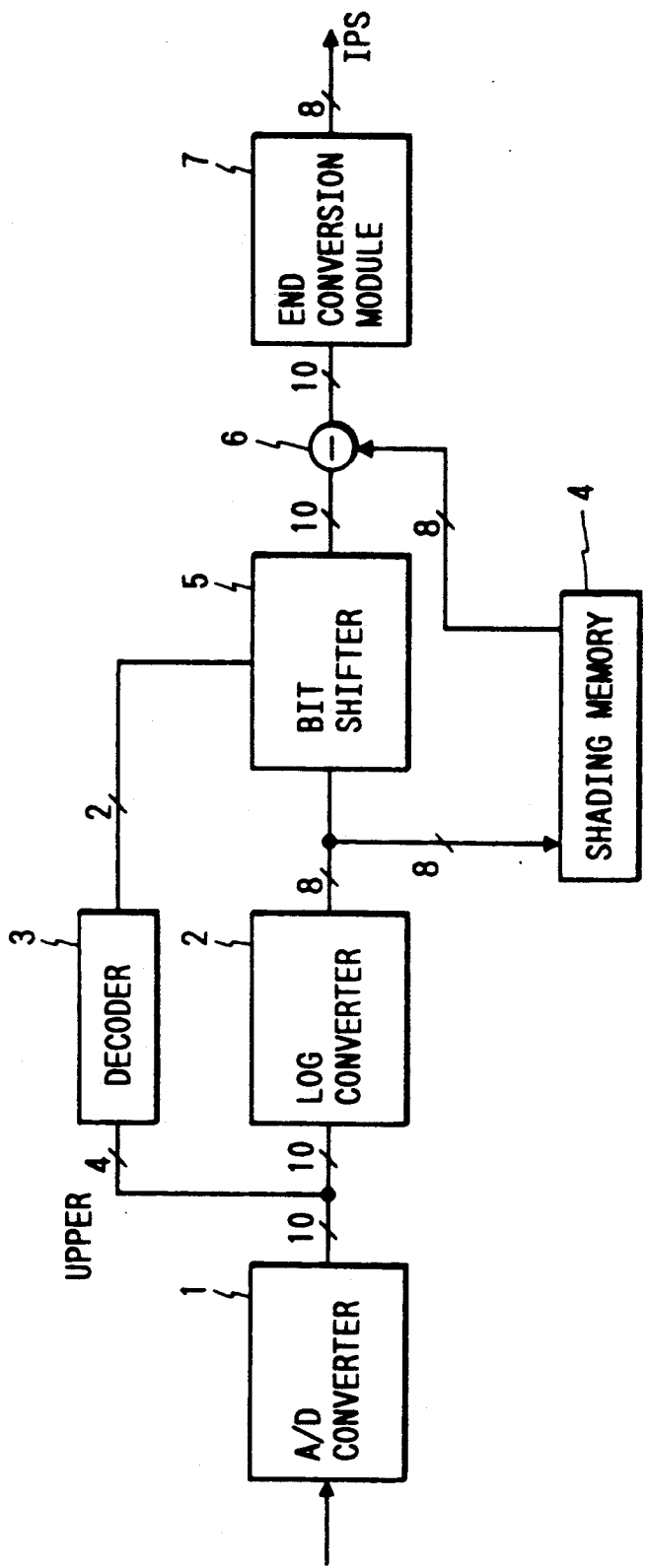
FIG. 1 is a diagram illustrating the configuration of an image reading apparatus of the invention.

The configuration of the invention will now be described with reference to FIG. 1. In FIG. 1, reference numeral 1 designates an A/D converter; 2, logarithmic converter; 3, decoder; 4, shading memory composed of a RAM; 5, bit shifter; 6, subtractor; and 7, END conversion module.

A signal read from the image sensor is converted to a 10-bit digital signal at the A/D converter 1, and further converted to an 8-bit digital signal at the logarithmic converter 2. The logarithmic converter 2 generates an 8-bit digital output from a 10-bit address input. For example, the logarithmic converter 2 is made up of an 8-bit ROM which stores a conversion table such as shown in FIG. 5 and allows its conversion characteristics to be changed in accordance with one of the three densities: low, intermediate, and high.

It is assumed in FIG. 5 that 10-bit signal inputs (0 to 1023) corresponding to reflectances from 0 to 100% are indicated in the horizontal axis in function of 8-bit signal outputs in the vertical axis, and logarithmic conversion performed by the logarithmic converter 2 produces outputs based on three conversion characteristics. In region C to which reflectances from 25 to 100% (256 to 1023) belong, an output of from 0 to 255 is generated relative to a density level of from 0 to 0.6, in accordance with a conversion characteristic designated as conversion curve 100. That is, the output in region C is produced under the operation $Y=X$, where Y is the output produced by the logarithmic converter 2 based on a specific conversion curve and X is the 8-bit digital signal output produced by the logarithmic converter 2 based on conversion curve 100, which is a value ranging from 0 to 255. This conversion with a sharp curve serves to prevent a plurality of inputted tone levels from being reduced into a single tone level.

In region B to which reflectances from 6.25 to 25% (64 to 255) belong, an output ranging from 256 to 511 is generated relative to a density level of from 0.6 to 1.2, which is twice the density level in region C, in accordance with a conversion characteristic designated as conversion curve 101. That is, the output in region B is produced under the operation $Y=2X$. The output ranging from 256 to 511 is produced by multiplying the output X by 2, while leaving the portions from 0 to 128 of the output X unused. Similarly, in region A to which reflectances from 0 to 6.25% (0 to 63) belong, an output ranging from 512 to 1023 is generated relative to a density level of from 1.2 to 2.4, which is four times the density level in region C, in accordance with a conversion characteristic designated as conversion curve 102. That is, the output is produced under the operation $Y=4X$. The output ranging from 512 to 1023 is produced by multiplying the output X by 4, while leaving the portions from 0 to 128 of the output X unused. These conversions with higher resolutions serve to prevent reproduced tone levels from being irregularly distanced from one another.

More specifically, assuming that a 10-bit signal is expressed as ($D_9 D_8 D_7 D_6 D_5 D_4 D_3 D_2 D_1 D_0$), an 8-bit output signal in region C is represented as ($D_7 D_6 D_5 D_4 D_3 D_2 D_1 D_0$); an 8-bit output signal in region B is represented as ($D_8 D_7 D_6 D_5 D_4 D_3 D_2 D_1$); and an 8-bit output signal in region A is represented as ($D_9 D_8 D_7 D_6 D_5 D_4 D_3 D_2$). By producing 8-bit signals with $Y=4X$ and combining these signals, 10-bit output signals are produced, allowing satisfactory high tone levels to be maintained.

To subject an 8-bit density signal to shading correction using the logarithmic converter having the above conversion characteristics, the 8-bit density signal produced by reading white data is stored in the shading memory 4 (FIG. 1). Being a signal relative to the white data, this density signal has a high reflectance, falling under region C in FIG. Thus, this density signal is expressed as an 8-bit signal ($D_7 D_6 D_5 D_4 D_3 D_2 D_1 D_0$).

On the other hand, the decoder 3 which receives an input consisting of the upper four bits ($D_9 D_8 D_7 D_6$) of a 10-bit output of the A/D converter 1 produces a bit-shifting output as shown in FIG. 6 (a), and the density digital signal is bit-shifted by the bit shifter 5 based on the produced bit shifting output.

Since an address input has a value equal to or larger than 256 in region C shown in FIG. 5, at least one of bits $D_9 D_8$ of the decoder input bits $D_9 D_8 D_7 D_6$ must be "1". In this case, let it be assumed that the shifting amount is "0".

With an address input being between 64 and 255 in region B, both bits $D_9$ and $D_8$ of the decoder input bits $D_9 D_8 D_7 D_6$ must be "0", while at least one of bits $D_7 D_6$ must be "1". In this case, let it be assumed that the shifting amount is "1".

With an address input being between 0 and 63 in region A, the decoder input bits $D_9 D_8 D_7$ must all be "0". In this case, let it be assumed that the shifting amount is "2".

As shown in FIG. 6 (b), bit shifting is effected as follows. In region C shown in FIG. 5, the value "0" is written to bits $D_9 D_8$ of the input bits by bit shifter 5 with the shifting amount being "0", producing a 10-bit output consisting of such bits as (0) (0) $D_7 D_6 D_5 D_4 D_3 D_2 D_1 D_0$. In region B, the input bits are shifted by "1" and the value "0" is thereafter written to bits $D_9$ and $D_0$, producing a 10-bit output consisting of such bits as (O) $D_8 D_7 D_6 D_5 D_4 D_3 D_2 D_1$ (O). Similarly, in region A, the input bits are shifted by "2" and the value "0" is thereafter written to bits $D_1 D_0$, producing an output consisting of such bits as $D_9 D_8 D_7 D_6 D_5 D_4 D_3 D_2$ (O) (O). Accordingly, a 10-bit signal is produced by the bit shifter 5. This implies that the 8-bit ROM used for logarithmic conversion provides a 10-bit density converter. A shading-corrected signal is obtained by subtracting an 8-bit white reference signal stored in the shading memory 4 from the thus produced 10-bit density signal by the subtractor 6. This prevents impairment of tone reproducibility.

The shading-corrected 10-bit signal is gray-balanced by the END conversion module 7 to be produced as an 8-bit color signal. Here, a 10-bit signal is converted to an 8-bit signal, because the signal is no longer subjected to such conversion as to impair tone quality at the IPS.

Figures 7, 8A:
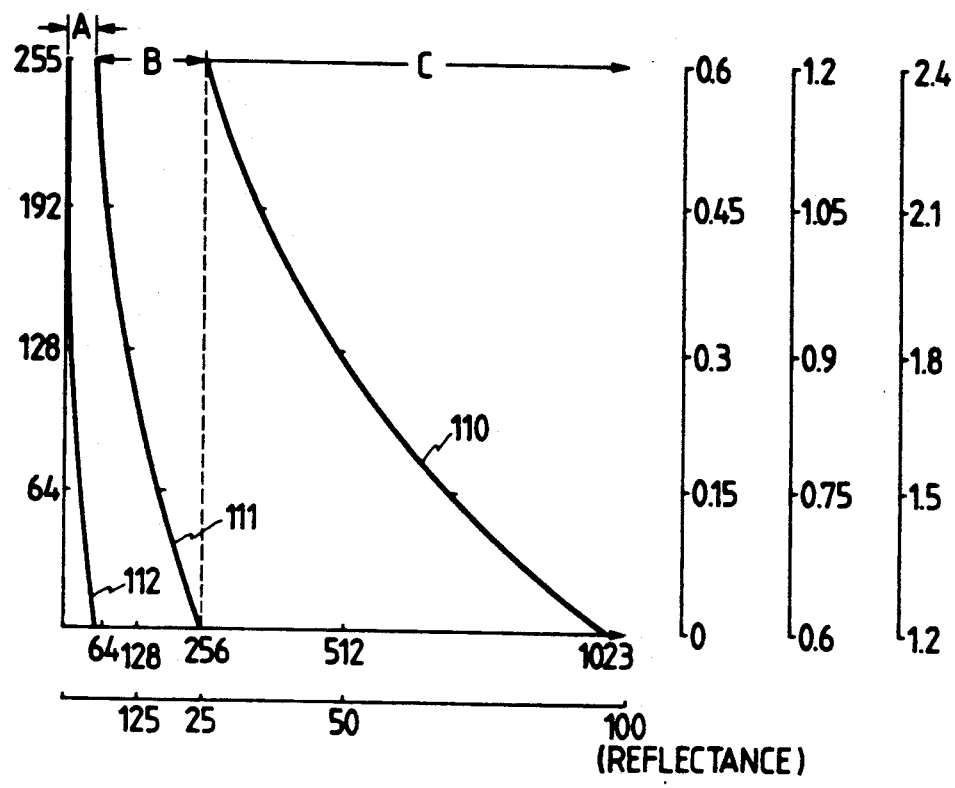
FIG. 7 is a diagram showing another example of the logarithmic conversion characteristic.

FIG. 7 is a diagram showing, as another embodiment, another example of logarithmic conversion characteristics different from those in the above-described embodiment. The circuit configuration of this embodiment is the same as that in the above-described embodiment.

A feature of this embodiment is the utilization of the lower half portion of the conversion table to improve tone reproduction accuracy in the high density region. Specifically, the conversion characteristics in regions B and A in FIG. 5 leave the lower half portion of the conversion table unutilized and thus, in this embodiment, the conversion characteristics are modified in a manner similar to that in the case of FIG. 5 in accordance with the combination of $D_9\ D_8\ D_7\ D_6$.

FIG. 8 (a) shows the bit shifting amounts. As shown in this figure, the shifting amount is "0" in regions C and B (conversion curves 110 and 111) in FIG. 7, and "1" in region A (conversion curve 112) in FIG. 7.

FIG. 8 (b) shows the output data of the bit shifter 5.

Density data produced by density conversion consists of 10 bits ranging from 0 to 1023, 0 to 255 of which belong to region C. In region C, the 10-bit output data is represented as (O) (O) $D_7\ D_6\ D_5\ D_4\ D_3\ D_2\ D_1\ D_0$) by writing "O" to its highest 2 bits, as shown in FIG. 8 (b). Thus, the output X is used with no further operation; i.e., the value produced under the operation $Y=X$ is outputted.

In region B, 10-bit data ranging from 256 to 511 is produced out of the data from 0 to 1023. Accordingly, 8-bit data X from 0 to 255 is stored in the 8-bit logarithmic conversion ROM, and by adding 1 as its ninth bit to provide additional 256. With the additional bit, the 10-bit data 256 to 511 can be produced as the density output Y under the operation $Y=X+256$, and it is represented as (O) (1) $D_7\ D_6\ D_5\ D_4\ D_3\ D_2\ D_1\ D_0$.

Similarly, in region A, 10-bit data ranging from 512 to 1023 is produced. Accordingly, "1" is added to the 8-bit logarithmic conversion output X, 0 to 255, as its tenth bit to provide additional 256, i.e., $X+256$, and this term $(X+256)$ is multiplied by "2". With the additional bit, the 10-bit data 512 to 1023 can be produced as the density output Y under the operation $Y=2X+512$, and it is represented as (1) $D_8\ D_7\ D_6\ D_5\ D_4\ D_3\ D_2\ D_1$ (O).

The conversion characteristic in region B in the first embodiment shown in FIG. 5 is $Y=2X$, allowing the density data to be expressed only in even numbers but not in odd numbers, which is a shortcoming. However, the feature of the second embodiment can overcome this shortcoming encountered by the output data in region B.

Figure 9A:
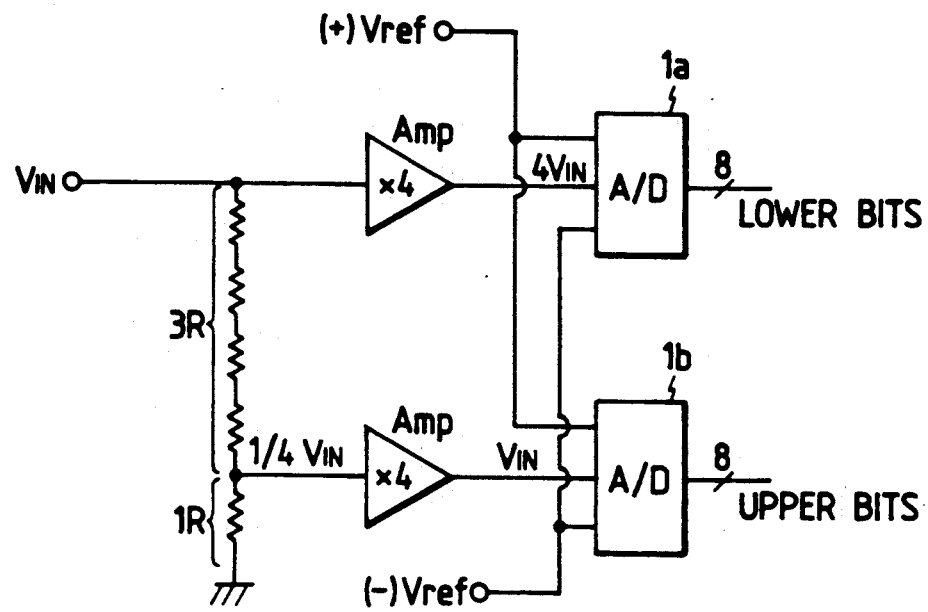
FIGS. 9 (a) and 9 (b) are diagrams showing an example of the configuration of a 10-bit A/D converter.
Figure 9B:
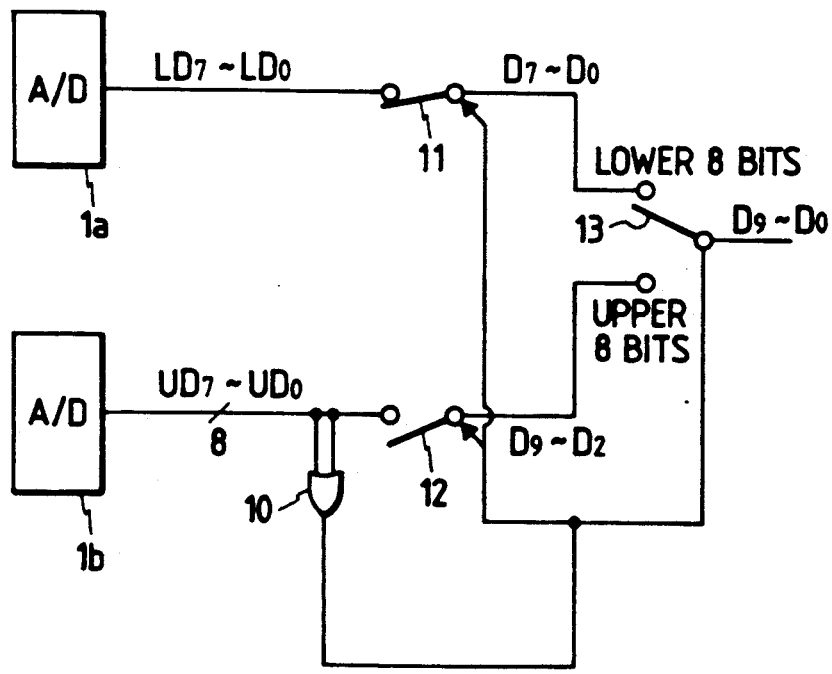
Figure 10:
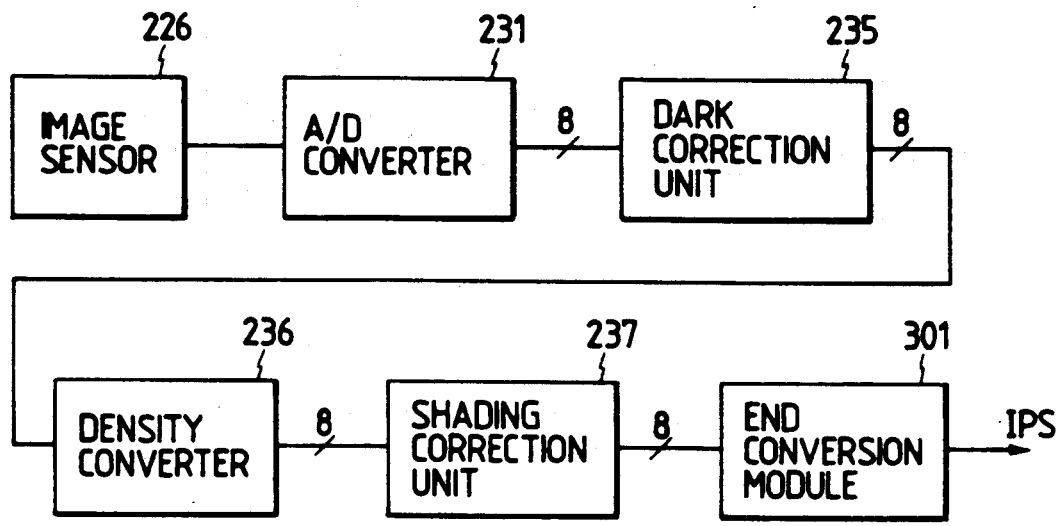
FIG. 10 is a diagram showing the configuration of a conventional image reading apparatus.
Figure 11:
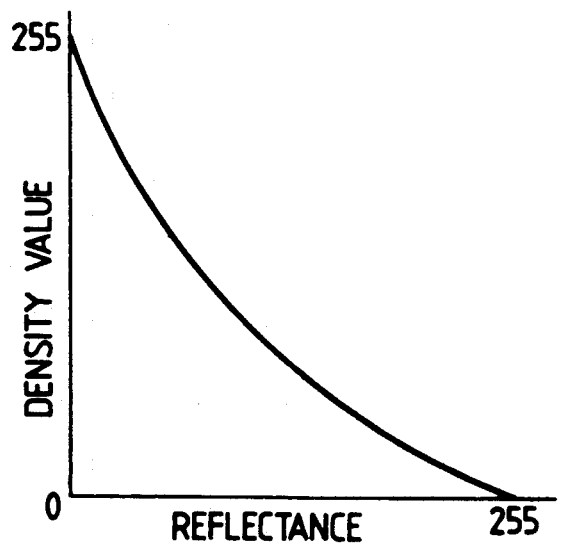
FIG. 11 is a diagram showing a conventional logarithmic conversion characteristic.

FIGS. 9 (a) and 9 (b) are diagrams showing an example in which 10-bit A/D conversion is performed using two 8-bit A/D converters.

In FIG. 9 (a), an input signal $V_{IN}$ is divided at a ratio of 4 to 1 into two components, one corresponding to a lower digit signal and the other corresponding to an upper digit signal, and these components are multiplied by, e.g., 4 by amplifiers, respectively to produce signals $4V_{IN}$ (the lower digit signal) and $V_{IN}$ (the upper digit signal). These signals $4V_{IN}$ and $V_{IN}$ are then applied to 8-bit A/D converters 1a and 1b, respectively. If it is so arranged that an 8-bit signal consisting of bits $D_7$ to $D_0$ can be obtained by A/D-converting the lower digit signal $4V_{IN}$, then the output of the A/D converter 1a becomes saturated at a certain level with increasing $V_{IN}$. As a result, the upper digit signal $V_{IN}$ is A/D-converted at A/D converter 1b, i.e., the upper digit signal $V_{IN}$ has its lowest 2 bits discarded and has its entire bits bit-shifted toward left to obtain an 8-bit signal consisting of bits $D_9$ to $D_2$. Then, as shown in FIG. 9 (b), if the highest 2 bits for the upper digit signal are ORed, its output is "0", because bits $D_9$ and $D_8$ are represented by "0" when the signal $V_{IN}$ is small and the input to OR circuit 10 is 255 or less, while its output is "1" because at least one of bits $D_9$ and $D_8$ is represented by "1" when the signal $V_{IN}$ is large and the input to OR circuit 10 is 256 or more. Thus, if the output of OR circuit 10 is "0", the output $D_7$ to $D_0$ of the A/D converter 1a is outputted, while if the output of OR circuit 10 is "1", the output $D_9$ to $D_2$ of the A/D converter 1b is outputted by changing switches 11 and 12, then a 10-bit output $D_9$ to $D_0$ can be obtained from an output terminal through switch 13.

Accordingly, a 10-bit A/D converter can be implemented by combining two inexpensive 8-bit A/D converters.

With the A/D converters being of 8-bit configuration, the density converting system of the invention provides a higher tone resolution and shading correction accuracy in the low density region than the conventional shading correcting system using 8-bit density signals. In addition, it is economical to use the 8-bit ROM and shading memory.

As described in the foregoing, the invention maintains the tone level of an 8-bit signal, thereby producing high-quality images. Further, not only 10-bit signals can be subjected to shading correction while using an inexpensive 8-bit memory, but also 10-bit signals can be A/D-converted while using inexpensive 8-bit A/D converters.

What is claimed is:

1. An image reading apparatus comprising:
   A/D conversion means for converting an analog detection signal read by an image reading sensor to a digital value, the digital value being in one of a plurality of value ranges and consisting of $n+\Delta n$ bits, wherein n and $\Delta n$ are whole numbers;
   logarithmic conversion means for converting the digital value from said A/D conversion means to a logarithmic value according to predetermined conversion characteristics, the logarithmic value being in one of a plurality of density regions and consisting of n bits, the predetermined conversion characteristics being different for each value range;
   identification means for identifying the density region of the logarithmic value of said logarithmic conversion means based on the digital value of said A/D conversion means; and
   bit conversion means for converting the logarithmic value of said logarithmic conversion means to a density signal consisting of $n+\Delta n$ bits in accordance with the density region identified by said identification means.

2. An image reading apparatus according to claim 1, wherein said logarithmic conversion means is formed of a look-up table.

3. An image reading apparatus according to claim 1, wherein said density regions comprise a low density region, an intermediate density region, and a high density region.

4. An image reading apparatus according to claim 1, wherein said value n is 8.

5. An image reading apparatus according to claim 1, further comprising:
   means for storing n-bit reference density data; and
   means for subtracting the reference density data stored in said storage means from an output of said bit conversion means.

6. An image reading apparatus according to claim 5, wherein said storage means is formed of a random access memory and stores white reference data converted by said logarithmic conversion means.

7. An image reading apparatus according to claim 1, wherein said A/D conversion means includes:
   means for dividing an input signal into two intensity proportions;
   two n-bit A/D converters for converting said divided input signals respectively; and
   means for synthesizing respective outputs of said n-bit A/D converters into a digital value consisting of $n + \Delta n$ bits.

8. An image reading apparatus according to claim 1, wherein said value $\Delta n$ is 2.

9. An image reading apparatus comprising:
   A/D conversion means for converting an analog detection signal read by an image reading sensor to a digital value, the digital value being in one of a plurality of value ranges and consisting of $n + \Delta n$ bits, wherein n and $\Delta n$ are whole numbers;
   logarithmic conversion means for converting the digital value from said A/D conversion means to a logarithmic value according to predetermined conversion characteristics, the logarithmic value being in one of a plurality of density regions and consisting of n bits, the predetermined conversion characteristics being different for each value range;
   identification means for identifying the density region of the logarithmic value of said logarithmic conversion means based on the digital value of said A/D conversion means; and
   bit conversion means for converting the logarithmic value of said logarithmic conversion means to a density signal consisting of $n + \Delta n$ bits in accordance with the density region identified by said identification means, wherein said identification means is formed of a decoder for identifying a density region from upper bits in an output of said A/D conversion means.

* * * * *